United States Patent
Chen et al.

(10) Patent No.: US 11,611,634 B2
(45) Date of Patent: Mar. 21, 2023

(54) METHOD AND DEVICE FOR TIMEOUT MONITORING

(71) Applicant: CHINA UNIONPAY CO., LTD., Shanghai (CN)

(72) Inventors: Lin Chen, Shanghai (CN); Longxian Zhu, Shanghai (CN); Sen Yang, Shanghai (CN); Junhao Zhang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 743 days.

(21) Appl. No.: 16/470,206

(22) PCT Filed: Dec. 21, 2017

(86) PCT No.: PCT/CN2017/117733
§ 371 (c)(1),
(2) Date: Jun. 15, 2019

(87) PCT Pub. No.: WO2018/121404
PCT Pub. Date: Jul. 5, 2018

(65) Prior Publication Data
US 2020/0021665 A1    Jan. 16, 2020

(30) Foreign Application Priority Data

Dec. 26, 2016   (CN) .......................... 201611219406.4

(51) Int. Cl.
*H04L 67/5682*    (2022.01)
*G06F 11/30*    (2006.01)
(Continued)

(52) U.S. Cl.
CPC ...... *H04L 67/5682* (2022.05); *G06F 11/3006* (2013.01); *G06F 11/3037* (2013.01);
(Continued)

(58) Field of Classification Search
CPC ............... H04L 67/5682; H04L 67/143; H04L 67/62; G06F 11/3006; G06F 11/3037; G06F 12/0897
See application file for complete search history.

(56) References Cited

U.S. PATENT DOCUMENTS 7,711,956 B2 *  5/2010  Kinoshita ........... H04L 67/2852
                                                                713/168
8,452,888 B2 *  5/2013  Chan ....................... H04L 43/08
                                                                709/232
(Continued)

FOREIGN PATENT DOCUMENTS

CN        1859183 A      11/2006
CN      101702173 A       5/2010
(Continued)

OTHER PUBLICATIONS

Machine Translation of Patent Document CN104917645A, "Online detection message transmission timeout method and device", pp. 1-10. (Year: 2015).*
(Continued)

*Primary Examiner* — Philip C Lee
(74) *Attorney, Agent, or Firm* — Renner, Otto, Boisselle & Sklar, LLP

(57) ABSTRACT

Disclosed are a method and device for timeout monitoring, comprising: determining key information of a request message, the key information including a sending time of the request message; storing the key information to a first level cache; scanning the first level cache according to a set frequency, if the first level cache includes a first request message, storing the key information of the first request message into a second level cache, the first request message being a request message for which a reply message is not received; scanning the second level cache, and determining by a message log whether a reply message is received for a (Continued)

second request message in the second level cache, if not, the second request message times out, the second request message is a request message in which the difference value between a sending time and a current time is greater than a time-out threshold.

16 Claims, 5 Drawing Sheets

(51) Int. Cl.
  *G06F 12/0897* (2016.01)
  *H04L 67/143* (2022.01)
  *H04L 67/62* (2022.01)

(52) U.S. Cl.
  CPC ........ *G06F 12/0897* (2013.01); *H04L 67/143* (2013.01); *H04L 67/62* (2022.05)

(56) References Cited

U.S. PATENT DOCUMENTS

| | | | | |
|---|---|---|---|---|
| 9,503,544 | B2* | 11/2016 | Luna | H04W 28/02 |
| 9,661,103 | B2* | 5/2017 | Luna | H04L 67/322 |
| 9,996,403 | B2* | 6/2018 | Frank | G06F 9/546 |
| 2005/0216421 | A1* | 9/2005 | Barry | G06F 16/972 |
| | | | | 705/64 |
| 2008/0168446 | A1 | 7/2008 | Shen | |
| 2008/0320151 | A1* | 12/2008 | McCanne | H04L 67/2842 |
| | | | | 709/228 |
| 2009/0083279 | A1* | 3/2009 | Hasek | H04N 21/23439 |
| 2012/0290717 | A1* | 11/2012 | Luna | H04L 67/2852 |
| | | | | 709/224 |
| 2013/0091273 | A1* | 4/2013 | Ly | H04L 67/2804 |
| | | | | 709/224 |
| 2014/0082129 | A1* | 3/2014 | Beard | H04L 67/1097 |
| | | | | 709/216 |
| 2014/0173088 | A1* | 6/2014 | Varney | H04L 61/2507 |
| | | | | 709/224 |
| 2015/0189033 | A1* | 7/2015 | Han | H04L 67/2842 |
| | | | | 709/203 |
| 2015/0296505 | A1* | 10/2015 | Luna | H04L 67/1095 |
| | | | | 370/329 |
| 2015/0339178 | A1* | 11/2015 | Heisswolf | G06F 11/0703 |
| | | | | 714/55 |
| 2016/0011900 | A1* | 1/2016 | Reddy | G06F 9/4408 |
| | | | | 718/1 |
| 2017/0123939 | A1* | 5/2017 | Maheshwari | G06F 11/2069 |
| 2017/0201456 | A1* | 7/2017 | Siow | H04W 8/183 |

FOREIGN PATENT DOCUMENTS

| | | | |
|---|---|---|---|
| CN | 103581225 | A | 2/2014 |
| CN | 103858112 | A | 6/2014 |
| CN | 104917645 | | 9/2015 |
| CN | 105471616 | A | 4/2016 |
| CN | 105516548 | A | 4/2016 |
| CN | 105721632 | A | 6/2016 |
| CN | 105847184 | A | 8/2016 |
| CN | 106210021 | A | 12/2016 |
| CN | 106789431 | A | 5/2017 |
| CN | 108073446 | B * | 11/2020 ........... G06F 15/167 |

OTHER PUBLICATIONS

International Search Report (ISR) (with English translation) and Written Opinino (WO) for corresponding Application No. PCT/CN2017/117733, dated Feb. 27, 2018.

* cited by examiner

METHOD AND DEVICE FOR TIMEOUT MONITORING

This application is a National Stage of International Application No. PCT/CN2017/117733, filed on Dec. 21, 2017, which claims the priority of Chinese Patent Application No. 201611219406.4, filed with the Chinese Patent Office on Dec. 26, 2016, and entitled "A timeout monitoring method and apparatus", both of which are hereby incorporated by reference in their entireties.

FIELD

The present invention relates to the field of data processing, and particularly to a timeout monitoring method and apparatus.

BACKGROUND

Generally a data request is sent over the Internet based upon the Internet protocol to request data information. However, the existing network environment is so complicated that corresponding data information may not be obtained in a timely manner in response to each data request. As opposed to a synchronous request, the next data packet for an asynchronous request is transmitted by a transmitter directly after transmitting data, without waiting for any response from a receiver. In a transaction system after the asynchronous request is sent, a period of time responding from the opposite party is monitored, and if the period of time is above a preset threshold, it will be determined that the response to the request is timeout and invalidated.

SUMMARY

Some embodiments of the invention provide an timeout monitoring method including:

determining, by a server, key information of a request message, wherein the key information comprises a sending time of the request message;

storing, by the server, the key information into a first level cache;

scanning, by the server, the first level cache at a preset frequency, and under a condition the first level cache comprises a first request message, storing key information of the first request message into a second level cache, wherein the first request message is not fed back through a response message; and scanning, by the server, the second level cache; determining whether a response message corresponding to a second request message in the second level cache is received, according to a message log, and under a condition the response message corresponding to the second request message in the second level cache is received, determining that the second request message is timeout, wherein a difference between a sending time of the second request message and a current time is greater than a time-out threshold.

Some embodiments of the invention provide a timeout monitoring apparatus including:

a writing module configured to determine key information of a request message, wherein the key information comprises a sending time of the request message;

the writing module further configured to store the key information into a first level cache;

a first monitoring module configured to scan the first level cache at a preset frequency, and under a condition the first level cache comprises a first request message, to store key information of the first request message into a second level cache, wherein the first request message is not fed back through a response message; and a second monitoring module configured to scan the second level cache, to determine whether a response message corresponding to a second request message in the second level cache is received, according to a message log, and under a condition the response message corresponding to the second request message in the second level cache is received, to determine that the second request message is timeout, wherein a difference between a sending time of the second request message and a current time is greater than a time-out threshold.

Some embodiments of the invention provide a computer readable storage medium storing computer executable instructions configured to cause a computer to perform the method according to any one of the technical solutions above.

Some embodiments of the invention provide a computing device including:

a memory configured to store program instructions; and a processor configured to invoke the program instructions stored in the memory, and to execute the program instructions to perform the method according to any one of the technical solutions above.

Some embodiments of the invention provide a computer program product for causing a computer to perform the method according to any one of the technical solutions above, upon being executed on the computer.

BRIEF DESCRIPTION OF THE DRAWINGS

In order to make the technical solutions according to the embodiments of the invention more apparent, the drawings to which reference is to made in the description of the embodiments will be introduced below in brief. Apparently the drawings to be described below illustrate only some embodiments of the invention, and those ordinarily skilled in the art can further derive other drawings from these drawings without any inventive effort.

DETAILED DESCRIPTION OF THE EMBODIMENTS

In order to make the objects, technical solutions, and advantages of the invention more apparent, the invention will be described below in further details with reference to the drawings. Apparently the embodiments to be described are only a part but all of the embodiments of the invention. Based upon the embodiments here of the invention, all of other embodiments which can occur to those ordinarily skilled in the art without any inventive effort shall come into the scope of the invention as claimed.

Figure 1:
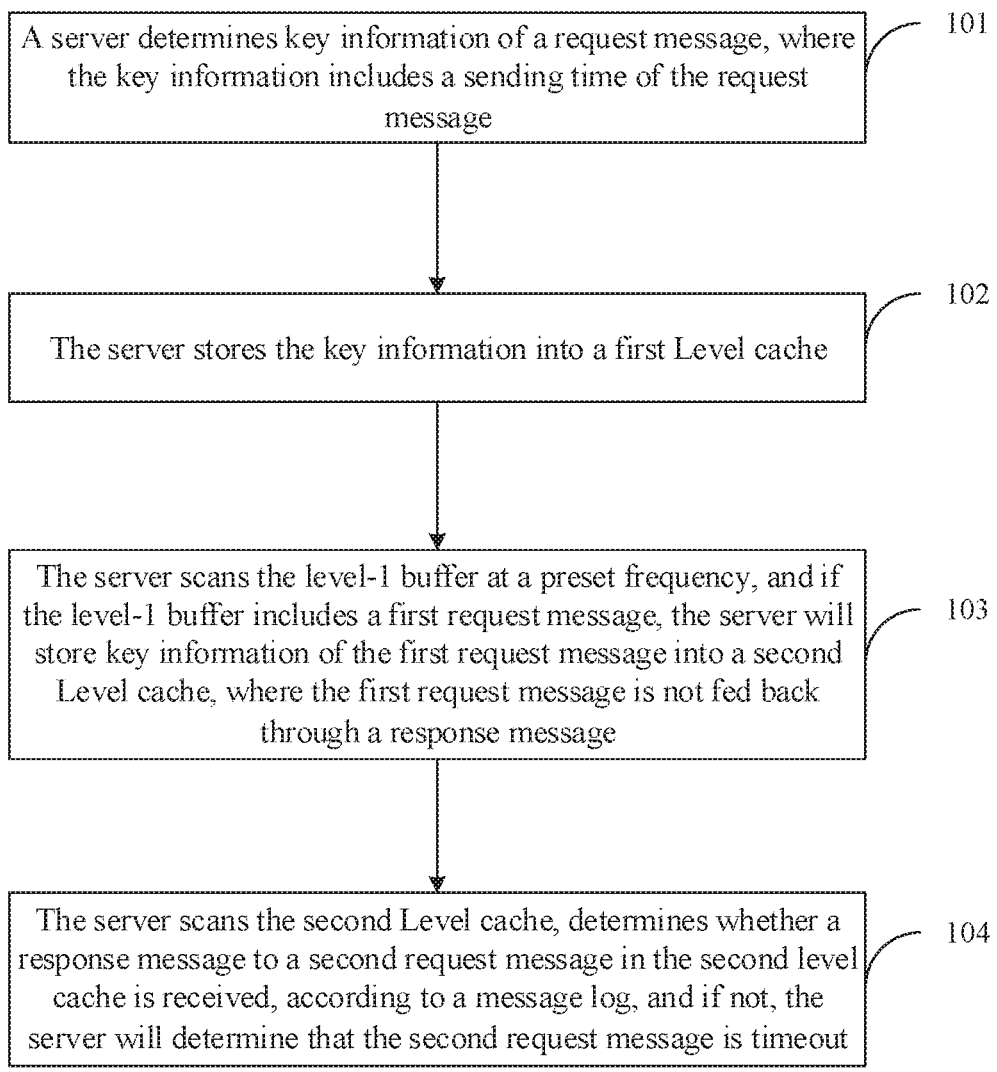
FIG. 1 is a flow chart of a timeout monitoring method according to some embodiments of the invention.

FIG. 1 illustrates a flow chart of a timeout monitoring method according to some embodiments of the invention, where the method can include the following steps.

In the step 101, a server determines key information of a request message, where the key information includes a sending time of the request message.

In the step above, the key information of the request message includes the instance of time when the request message is sent, and the server stores the instance of time when the request message is sent, into a buffer, and can determine whether a response message to the request message has not been received after a response deadline expires, according to the instance of time when the request message is sent. Furthermore, the key information further includes a primary key of the request message, and a distributed buffer in the server can be searched quickly for related information of the request message according to the primary key of the request message.

In the step 102, the server stores the key information into a first level cache.

In the step 103, the server scans the first level cache at a preset frequency, and if the first level cache includes a first request message, the server will store key information of the first request message into a second level cache, where the first request message represents a response message is not received.

In the step 104, the server scans the second level cache, determines whether a response message to a second request message in the second level cache is received, according to a message log, and if not, the server will determine that the second request message is timeout, where the second request message represents the difference between a sending time of the request message, and the current instance of time is greater than a time-out threshold.

In some embodiments of the invention, the server stores key information of a request message into the first level cache after sending the request message, where the key information of the request message includes a sending time of the request message. The server scans the first level cache at a preset frequency, determines whether a response message to a request message in the first level cache is received, according to the key information, determines the request message to which a response message is not received, as a first request message, and stores the key information of the first request message into the second level cache. Since response messages to the majority of request messages are fed back in a very short period of time, only a few request messages in the first level cache will be determined as first request messages, and stored into the second level cache. Moreover, the server scans the second level cache, and determines the difference between an instance of time when a request message is sent, and the current instance of time, according to the key information, and if the difference is greater than an overhead threshold, the server will determine the request message as a second request message, search a message log of the second request message, and determine whether a response message to the second request message is received according to the message log. If a response message to the second request message has not been received, the server will determine that the second request message is timeout. In some embodiments of the invention, the key information of the request messages is stored into the buffer, and the responses to the request messages are buffered and monitored without any storage and computing at a database, thus alleviating resources in the database from being consumed, and lowering a burden on the database.

In some embodiments of the invention, in order to alleviate the burden on the database, two levels of buffers are set up in the server, where the first level cache for storing the key information of all the sent request messages has a larger capacity than that of the second level cache, and is generally designed as a shared memory. Moreover, in order to improve the efficiency, if there is a small amount of traffic, the data may alternatively be data in an intra-process memory, or mapped in a memory as needed for a number of transactions, and traffic, where if the data are mapped in a memory, the data may be recovered after the server is powered off, or temporarily broken down, and a file can be written using an operating system while the memory is operating. Accordingly, the second level cache can also be a shared memory, and if there is a small amount of traffic, the second request message may be stored directly in an intra-process memory space to thereby further improve the efficiency.

For the sake of convenient supervision, the first level cache is divided into a plurality of memory zones, and the step 102 includes:

the server determines a writing instance of time when the request message is stored into the first level cache; and the server stores the key information of the request message into a corresponding memory zone according to a remainder of dividing the writing instance of time of the request message by N, where a memory of the first level cache is divided in advance into N memory zones, and the size of each memory zone is the size of a data segment of the key information multiplied with the estimated number of transactions in a unit of time.

Particularly, the memory of the first level cache is divided in advance into N memory zones, and for the sake of convenient calculation and categorization, the value of N is generally determined according to the time-out threshold. Since the time-out threshold is generally tens of seconds, the value of N can also be tens accordingly, and in embodiments of the invention, the value of N is set to 60, that is, the memory of the first level cache is divided into 60 memory zones. For the sake of a convenient description, these 60 memory zones are numbered from 0 to 59.

After the request message is sent, the server adds the key information of the request message to a queue for waiting from being written into the first level cache. The key information is stored into the first level cache by dividing the current writing instance of time by N, and storing the key information into the corresponding memory zone according to the remainder. For example, in some embodiments of the invention, the value of N is 60, and the memory zones are numbered from 0 to 59. If the current writing instance of time when the key information is stored in the first level cache is 13:48:34, the current writing instance of time will be divided by 60 seconds, and the remainder will be 34, so the key information of the request message will be stored into the memory zone numbered 34.

In order to guarantee both the capacities of the memory zones, and the operating efficiency of the server, in some embodiments of the invention, the server initializes the memory zones of the first level cache, where the size of an initialized memory zone is the size of a data segment of key information multiplied with the estimated number of transactions in a unit of time, so the size of one memory zone is same with that of another in the same period of time. In different periods of time, the size of an initialized memory zone is increasing with an increasing number of transactions in a unit of time. Since the size of a memory zone is determined according to an estimated peak number of transactions in a unit of time when it is initialized, there will be a storage space sufficient to store the key information. Moreover for different periods of time, a parameter can be adjusted to thereby newly request and allocate a sufficiently large memory zone.

The server can also scan each memory zone at some frequency while storing the key information into the memory zone. In order to guarantee the efficiency, and for the sake of convenient management, the server scans the respective memory zones respectively, so the server scans the first level cache at the preset frequency in the step 103 above as follows:

the server creates N monitoring processes, where each monitoring process corresponds to one of the memory zones, and scans the corresponding memory zone at the preset frequency.

Stated otherwise, in some embodiments of the invention, the server creates N monitoring processes corresponding to the N memory zones, where each monitoring process corresponds to one of the memory zones, and is responsible for scanning the corresponding memory zone starting with the start point of the memory zone. Statistically, more than 95% of request messages are generally fed hack through response messages in five seconds, and particularly, approximately 99% of request messages are fed back through response messages in two seconds, so the monitoring process generally scans the memory zone at an interval of time of one to two seconds, that is, the monitoring process scans the corresponding memory zone once at a two-second interval of time. The server stores each received request message into its corresponding memory zone starting with the start point of the memory zones. The monitor process can set an end flag at the beginning of each scan so that the monitoring process will not end the current scan until the first end flag in the memory zone, or the monitoring process does not scan the corresponding memory zone until the end of the corresponding memory zone is reached in each scan.

After the server stores the key information of the request message into the first level cache, it modifies the key information of the request message upon reception of a response message corresponding to the request message. In some embodiments of the invention, the method further includes:

the server searches the first level cache for a request message corresponding to a response message upon reception of the response message; and if a request message corresponding to the response message is found, the server will mark the key information of the request message corresponding to the response message as RESPONDED.

Particularly, if the server receives a response message between scanning intervals, it will search the first level cache for a corresponding request message, and if a corresponding request message is found, the server will mark the key information of the request message as RESPONDED, so that when the server finds the key information of the request message as a scan result, it determines that a response message to the request message is received, and will not perform any further processing on the request message. If a response message to the request message is not received, that is, the corresponding key information is not marked as RESPONDED, the server will determine the request message as a first request message, store the key information thereof into the second level cache; and delete the key information of the request message from the first level cache at the end of a scan.

Since the key information of the request messages in the second level cache has been monitored and filtered, the amount of key information stored in the second level cache is less than 5% of the total amount of key information, so there is a small memory space occupied by the second level cache, and the second level cache can be embodied as an intra-process link list. In the embodiments of the invention, the server scans the second level cache, and determines whether a response message to a second request message in the second level cache is received, according to the message log as follows:

the second level cache is embodied as a link list; and the key information of the first request messages is stored sequentially into the link list, starting with the head of the link list, in the sequential order of the instances of time when the first request messages are sent;

the server refers to the key information of the first request message in the link list sequentially starting with the head of the link list, and determines whether the difference between the instance of time when each of the first request messages, and the current instance of time is greater than the time-out threshold; and if so, then the server will determine the first request message as a second request message, and determine whether a response message to the second request message is received, according to the message log of the second request message; and if not; then the server will perform timeout processing on the second request message.

In some embodiments of the invention, the key information of the first request message is stored into the second level cache sequentially, starting with the head of the link list, in the sequential order of the instances of time when the first request messages are sent, so the first request message which is the first to send is stored in the link list head of the second level cache, and the first request message which is the last to send is stored in the link list tail thereof. Instead of N monitoring processes scanning the first level cache, in some embodiments of the invention, a monitoring process is created to scan the second level cache, and for the sake of a convenient description, the N monitoring processes scanning the first level cache will be referred to as first level monitoring processes; and the monitoring process scanning the second level cache will be referred to as a second level monitoring process. The second level monitoring process scans the link list of the second level cache cyclically, determines whether the link list of the second level cache is empty, starting with the head of the link list, and if so, then second level monitoring process will wait for the next scan; otherwise, second level monitoring process will determine whether the difference between the instance of time when the first request message is sent, and the current instance of time is greater than the time-out threshold, that is, determine whether the first request message is timeout, according to the key information stored in the second level cache, starting with the first request message, and if not, then the second level monitoring process will proceed to the second request message in the second level cache, and further make determination; otherwise, that is, if the difference between the instance of time when the first request message is sent, and the current instance of time is above the time-out threshold, then the second level monitoring process will determine the first request message as a second request message, search for a corresponding message log according to the key information of the second request message, and determine whether a response message to the second request message is received, according to the message log of the second request message, and if so, then a response message to the second request message will have been received, and no timeout processing will be performed thereon; otherwise, that is, if a response message to the second request message has not been received, then an external timeout processing service will be invoked to perform timeout processing on the second request message. Thereafter no matter whether a response message to the second request message is received, the second level monitoring process proceeds to the second request message in the second level cache, and further makes determinations unless all the request messages in the second level cache are traversed for making determination.

Furthermore, in some embodiments of the invention, an abnormality capturing device is further configured to capture a request message sent by the server while failing or being restarted, so that the server can reprocess the request message sent in that period of time. Alternatively the abnormality capturing device is triggered manually to capture a request starting with a specified point of time from the database, and to invoke the server for reprocessing.

Figure 2:
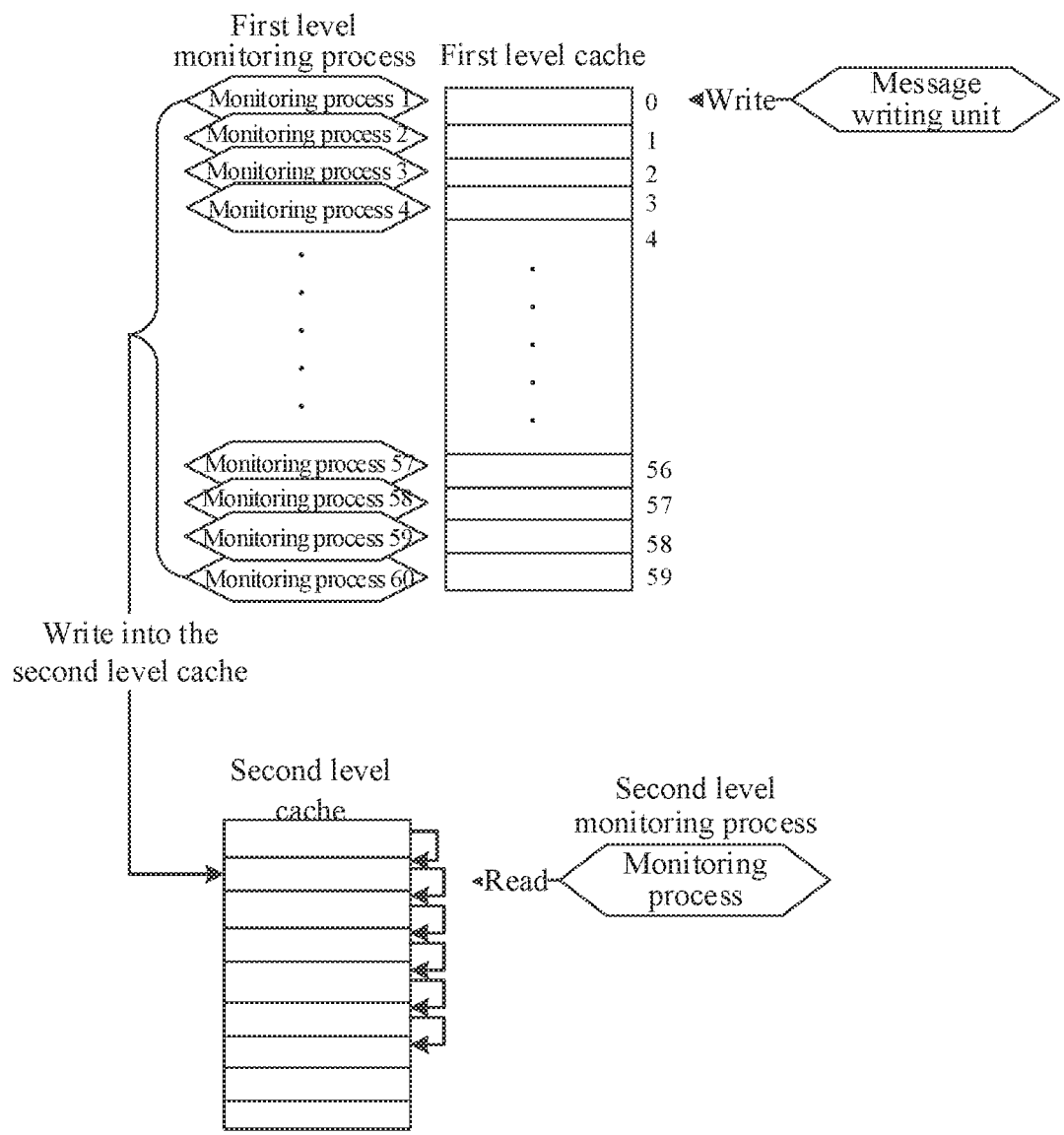
FIG. 2 is a system architecture to which embodiments of the invention is applicable.

In order to make the invention more apparent, the flow above will be described below in details in connection with a particular embodiment thereof, and in this particular embodiment, there are a message writing unit, a first level cache, a first level monitoring processes, a second level cache, and a second level monitoring process as illustrated in FIG. 2, where the message writing unit is responsible for obtaining key information of sent request message, and writing the key information into the first level cache; the first level cache includes 60 memory zones numbered from 0 to 59; and the number of first level monitoring processes is also 60, and they correspond respectively to the 60 memory zones of the first level cache in a one-to-one manner; and are responsible for monitoring the corresponding memory zones in the first level cache respectively, and writing the key information of the request messages to which response messages are not received, into the second level cache. The second level monitoring process is responsible for monitoring the key information in the second level cache, and if the time-out threshold is exceeded, then searching for a message log, determining that request messages to which response messages are not received, and invoking the external timeout processing apparatus to perform timeout processing on these request messages.

Figure 3:
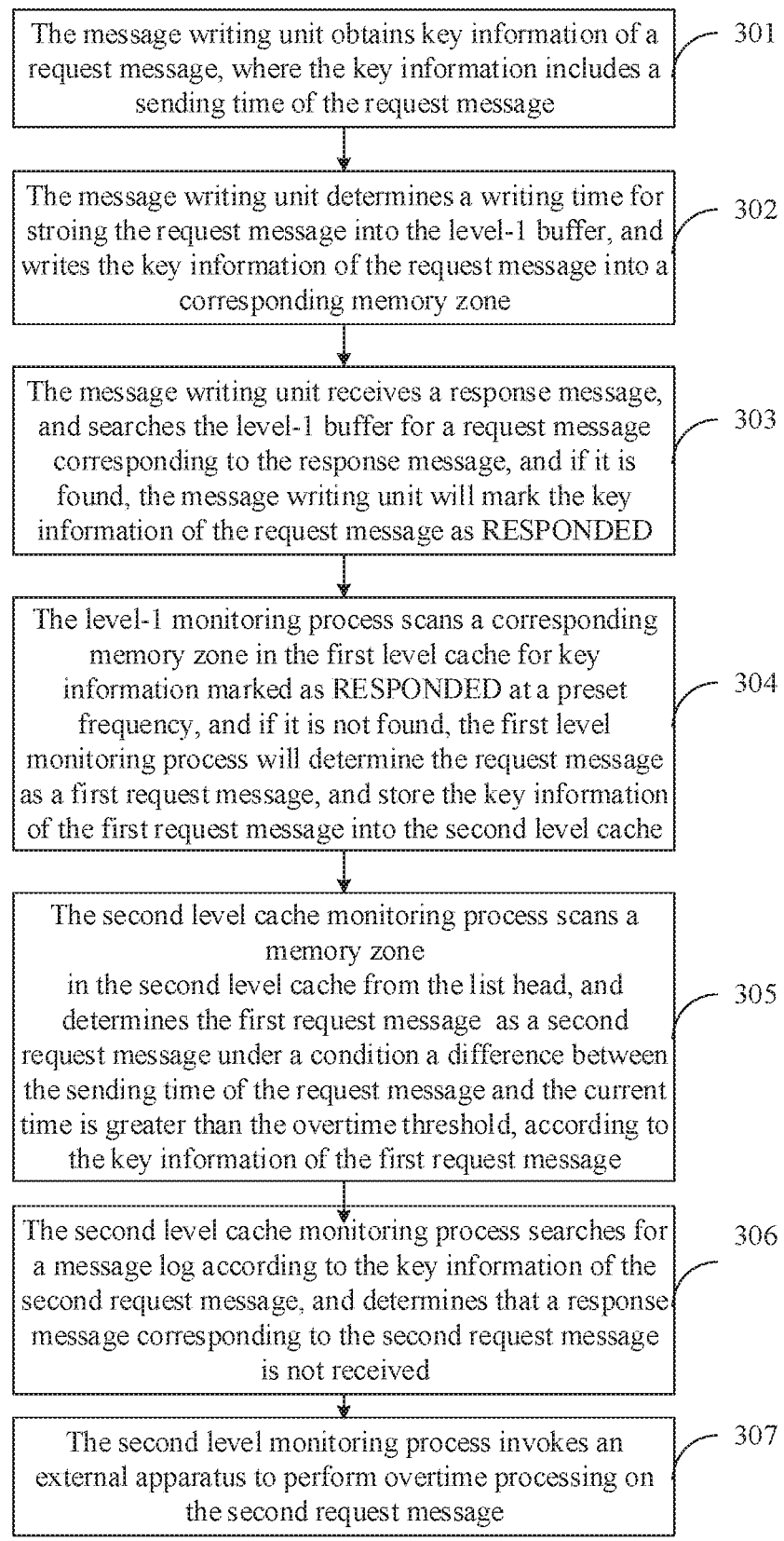
FIG. 3 is a flow chart of a timeout monitoring method according to another embodiment of the invention.

FIG. 3 illustrates the steps in the embodiment as follows:

in the step 301, the message writing unit obtains key information of a request message, where the key information includes the instance of time when the request message is sent;

in the step 302, the message writing unit determines a writing instance of time when the request message is stored into the first level cache, and writes the key information of the request message into a corresponding memory zone according to a remainder result of dividing the writing instance of time by 60 seconds;

in the step 303, the message writing unit receives a response message, and searches the first level cache for a request message corresponding to the response message, and if it is found, the message writing unit will mark the key information of the request message as RESPONDED;

in the step 304, the first level monitoring process scans a corresponding memory zone in the first level cache for key information marked as RESPONDED at a preset frequency, and if it is not found, the first level monitoring process will determine the request message as a first request message, and store the key information of the first request message into the second level cache;

in the step 305, the second level monitoring process scans a memory zone in the second level cache starting with the list head, and determines the first request message with the difference between the instance of time when the request message is sent, and the current instance of time being greater than the time-out threshold, as a second request message according to the key information of the first request message;

in the step 306, the second level monitoring process searches for a message log according to the key information of the second request message, and determines that a response message corresponding to the second request message is not received; and in the step 307, the second level monitoring process invokes an external apparatus to perform timeout processing on the second request message.

It shall be noted that in the steps above, the message writing unit, the first monitoring process, and the second monitoring process may perform their operations in any appropriate order, that is, while the message writing unit writes the key information of the request message into the first level cache, the first level monitoring process scans the first level cache at the preset frequency, and the second level monitoring process scans the second level cache periodically. The steps above have been numbered only for the sake of a convenient description.

Figure 4:
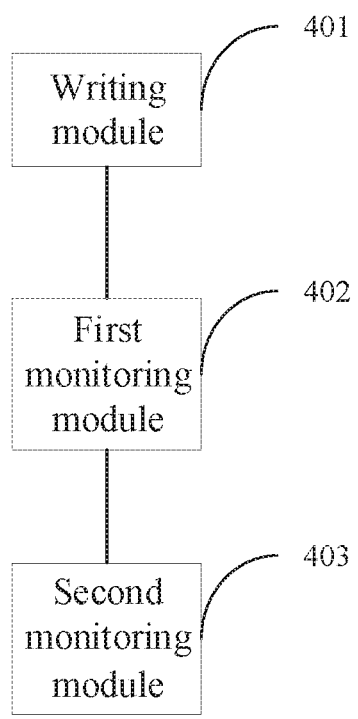
FIG. 4 is a schematic structural diagram of a timeout monitoring apparatus according to some embodiments of the invention.

Based upon the same technical idea, some embodiments of this disclosure further provide a timeout monitoring apparatus as illustrated in FIG. 4, which includes:

a writing module 401 is configured to determine key information of a request message, where the key information includes a sending time of the request message;

the writing module 401 is further configured to store the key information into a first level cache;

a first monitoring module 402 is configured to scan the first level cache at a preset frequency; and if the first level cache includes a first request message, to store key information of the first request message into a second level cache, where the first request message is a request message which is not fed back through a response message; and second monitoring module 403 is configured to scan the second level cache, to determine whether a response message corresponding to a second request message in the second level cache is received; according to a message log, and if not, to determine that the second request message is timeout, where the second request message is a request message of which the difference between a sending time of the request message; and the current instance of time is greater than a time-out threshold.

The writing module 401 is further configured:

if a response message is received, to search the first level cache for a request message corresponding to the response message; and if a request message corresponding to the response message is found, to mark the key information of the request message corresponding to the response message as RESPONDED.

The writing module 401 is configured:

to determine a writing instance of time when the request message is stored into the first level cache; and to write the key information of the request message into a corresponding memory zone according to a remainder result of dividing the writing instance of time of the request message by N; where a memory in the first level cache is divided in advance into N memory zones, and the size of each memory zone is the size of a data segment of the key information multiplied with the estimated number of transactions in a unit of time.

The first monitoring module 402 is configured:

to create N monitoring processes, where each monitoring process corresponds to one of the memory zones, and scans the corresponding memory zone at the preset frequency.

The second monitoring module 403 is configured:

when the second level cache is a link list, to store the key information of the first request messages sequentially into the link list, starting with the head of the link list, in the sequential order of the instances of time when the first request messages are sent;

to inquiry the key information of the first request message in the link list sequentially starting with the head of the link list, and to determine whether the difference between the instance of time when each of the first request messages, and the current instance of time is greater than the time-out threshold; and if so, to determine the first request message as a second request message, and to determine whether a response message to the second request message is received, according to the message log of the second request message; and if not, to perform timeout processing on the second request message.

Figure 5:
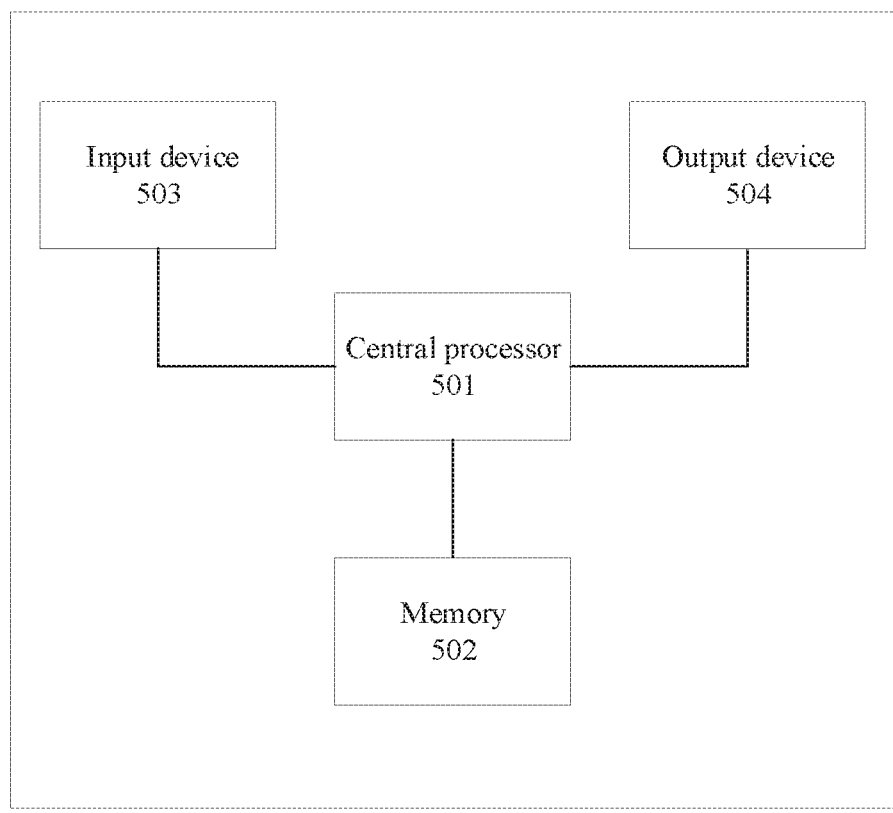
FIG. 5 is a schematic structural diagram of a computing device according to some embodiments of the invention.

Based upon the same technical idea, some embodiments of the invention further provide a computing device, which can be particularly a desktop computer, a portable computer, a smart mobile phone, a tablet computer, etc., a Personal Digital Assistant (PDA), etc. As illustrated in FIG. 5 which is a schematic structural diagram of a computing device according to some embodiments of the invention, the computing device can include a Central Processing Unit (CPU) 501, a memory 502, an input device 503, an output device 504, etc., where the input device 503 can include a keyboard, a mouse, a touch panel, etc., and the output device 504 can include a display device, e.g., a Liquid Crystal Display (LCD), a Cathode Ray Tube (CRT) display, etc.

The memory 502 can include a Read Only Memory (ROM) and a Random Access Memory (RAM), and provide the processor with program instructions and data stored in the memory. In the embodiment of the invention, the memory can be configured to store program for performing the method according to any one of the embodiments above of the invention, and the processor can invoke the program instructions stored in the memory, and be configured to execute the obtained program instructions to perform the method according to any one of the embodiments above of the invention.

Based upon the same technical idea, some embodiments of the invention further provides a computer readable storage medium configured to store computer program instructions to be executed by the computing device above, where the computer program instructions include program for performing the method according to any one of the embodiments above of the invention.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

Based upon the same technical idea, some embodiments of the invention further provide a computer program product for causing a computer to perform the method according to any one of the embodiments above of the invention, upon being executed on the computer.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for timeout monitoring, comprising:
determining, by a server, key information of a request message, wherein the key information comprises a sending time of the request message;
storing, by the server, the key information into a first level cache;
scanning, by the server, the first level cache at a preset frequency, and under a condition the first level cache comprises a first request message, storing key information of the first request message into a second level cache, wherein the first request message is not fed back through a response message; and
scanning, by the server, the second level cache, determining whether a response message corresponding to a second request message in the second level cache is not received, according to a message log, and under a condition the response message corresponding to the second request message in the second level cache is not received, determining that the second request message is timeout, wherein a difference between a sending time of the second request message and a current time is greater than a time-out threshold.

2. The method according to claim 1, further comprises:
under a condition the server receives the response message, searching in the first level cache for the request message corresponding to the response message; and
under a condition the request message corresponding to the response message is found, marking the key information of the request message corresponding to the response message as RESPONDED.

3. The method according to claim 1, wherein the storing, by the server, the key information into the first level cache comprises:
determining, by the server, a writing time for storing the request message into the first level cache;
storing, by the server, the key information of the request message into a corresponding memory zone according to a remainder result of dividing the writing time of the request message by N, wherein a memory in the first level cache is divided in advance into N memory zones, and a size of each memory zone is a size of a data segment of the key information multiplied with an estimated number of transactions in a unit of time.

4. The method according to claim 3, wherein the scanning, by the server, the first level cache at the preset frequency comprises:
creating, by the server, N monitoring processes, wherein each of the monitoring process corresponds to one of the memory zones, and scans a corresponding memory zone at the preset frequency.

5. The method according to claim 1, wherein the scanning, by the server, the second level cache, and determining whether a response message to a second request message in the second level cache is received, according to the message log comprises:
storing, by the server, the key information of the first request messages sequentially into a link list acting as the second level cache, from a head of the link list, in a sequential order of the sending time of the first request messages;
inquiring, by the server, the key information of the first request message in the link list sequentially from the head of the link list, and determining whether a difference between the sending time of the first request messages and the current time is greater than the time-out threshold; and
under a condition the difference between the sending time of the first request messages and the current time is greater than the time-out threshold, determining, by the server, the first request message as the second request message, and determining whether the response message corresponding to the second request message is received, according to the message log of the second request message; and under a condition the difference between the sending time of the first request messages and the current time is not greater than the time-out threshold, performing a timeout processing on the second request message.

6. A timeout monitoring apparatus, comprising:
a writing module configured to determine key information of a request message, wherein the key information comprises a sending time of the request message;
the writing module further configured to store the key information into a first level cache;
a first monitoring module configured to scan the first level cache at a preset frequency, and under a condition the first level cache comprises a first request message, to store key information of the first request message into a second level cache, wherein the first request message is not fed back through a response message; and
a second monitoring module configured to scan the second level cache, to determine whether a response message corresponding to a second request message in the second level cache is received, according to a message log, and under a condition the response message corresponding to the second request message in the second level cache is not received, to determine that the second request message is timeout, wherein a difference between a sending time of the second request message and a current time is greater than a time-out threshold.

7. The apparatus according to claim 6, wherein the writing module is further configured:
under a condition the response message is received, to search in the first level cache for the request message corresponding to the response message; and
under a condition the request message corresponding to the response message is found, to mark the key information of the request message corresponding to the response message as RESPONDED.

8. The apparatus according to claim 6, wherein the writing module is configured:
to determine a writing time for storing the request message into the first level cache; and
to store the key information of the request message into a corresponding memory zone according to a remainder result of dividing the writing time of the request message by N, wherein a memory in the first level cache is divided in advance into N memory zones, and a size of each memory zone is a size of a data segment of the key information multiplied with an estimated number of transactions in a unit of time.

9. The apparatus according to claim 8, wherein the first monitoring module is configured:
to create N monitoring processes, wherein each of the monitoring process corresponds to one of the memory zones, and scans a corresponding memory zone at the preset frequency.

10. The apparatus according to claim 6, wherein the second monitoring module is configured:
to store the key information of the first request messages sequentially into a link list acting as the second level cache, from a head of the link list, in a sequential order of the sending time of the first request messages;
to inquiry the key information of the first request message in the link list sequentially from the head of the link list, and determining whether a difference between the sending time of the first request messages and the current time is greater than the time-out threshold; and
under a condition the difference between the sending time of the first request messages and the current time is greater than the time-out threshold, to determine the first request message as the second request message, and to determine whether the response message corresponding to the second request message is received, according to the message log of the second request message; and under a condition the difference between the sending time of the first request messages and the current time is not greater than the time-out threshold, to perform a timeout processing on the second request message.

11. A computing device, comprising:
a memory configured to store program instructions; and
a processor configured to invoke the program instructions stored in the memory, and to execute the program instructions to perform the method according to claim 1.

12. A timeout monitoring apparatus, comprising: a memory configured to store program instructions; and a processor configured to execute the program instructions to:
determine key information of a request message, wherein the key information comprises a sending time of the request message;
store the key information into a first level cache;
scan the first level cache at a preset frequency, and under a condition the first level cache comprises a first request message, store key information of the first request message into a second level cache, wherein the first request message is not fed back through a response message; and
scan the second level cache, to determine whether a response message corresponding to a second request message in the second level cache is received, according to a message log, and under a condition the response message corresponding to the second request message in the second level cache is not received, determine that the second request message is timeout, wherein a difference between a sending time of the second request message and a current time is greater than a time-out threshold.

13. The apparatus according to claim 12, wherein the processor is further configured to execute the program instructions to:
under a condition the response message is received, search in the first level cache for the request message corresponding to the response message; and
under a condition the request message corresponding to the response message is found, mark the key information of the request message corresponding to the response message as RESPONDED.

14. The apparatus according to claim 12, wherein the processor is configured to execute the program instructions to:
determine a writing time for storing the request message into the first level cache; and
store the key information of the request message into a corresponding memory zone according to a remainder result of dividing the writing time of the request message by N, wherein a memory in the first level cache is divided in advance into N memory zones, and a size of each memory zone is a size of a data segment of the key information multiplied with an estimated number of transactions in a unit of time.

15. The apparatus according to claim 14, wherein the processor is configured to execute the program instructions to:
create N monitoring processes, wherein each of the monitoring process corresponds to one of the memory zones, and scans a corresponding memory zone at the preset frequency.

16. The apparatus according to claim 12, wherein the processor is configured to execute the program instructions to:
store the key information of the first request messages sequentially into a link list acting as the second level cache, from a head of the link list, in a sequential order of the sending time of the first request messages;
inquiry the key information of the first request message in the link list sequentially from the head of the link list, and determining whether a difference between the sending time of the first request messages and the current time is greater than the time-out threshold; and
under a condition the difference between the sending time of the first request messages and the current time is greater than the time-out threshold, determine the first request message as the second request message, and determine whether the response message corresponding to the second request message is received, according to the message log of the second request message; and under a condition the difference between the sending time of the first request messages and the current time is not greater than the time-out threshold, perform a timeout processing on the second request message.

* * * * *